(12) United States Patent
Clark et al.

(10) Patent No.: US 8,134,829 B2
(45) Date of Patent: Mar. 13, 2012

(54) FOLDABLE ELECTRONIC DEVICE

(75) Inventors: Peter Timothy Clark, Taipei (TW);
Huan-Chen Liu, Taipei (TW)

(73) Assignee: Asustek Computer Inc., Taipei (TW)

( * ) Notice: Subject to any disclaimer, the term of this patent is extended or adjusted under 35 U.S.C. 154(b) by 189 days.

(21) Appl. No.: 12/722,075

(22) Filed: Mar. 11, 2010

(65) Prior Publication Data

US 2011/0134590 A1    Jun. 9, 2011

(30) Foreign Application Priority Data

Mar. 12, 2009   (TW) ................................ 98108088 A

(51) Int. Cl.
*G06F 1/16* (2006.01)
(52) U.S. Cl. ................ 361/679.26; 345/647; 455/575.8; 16/382
(58) Field of Classification Search .................. 345/1.1, 345/173, 204, 156, 647, 619, 168; 361/679.01, 361/679.27, 679.55, 679.58, 679.15, 679.02, 361/679.57, 679.32, 679.06, 679.04, 679.44, 361/679.21; 455/575.3, 575.4, 19, 575.8; 312/319.2, 223.2, 244, 262; 16/303, 250, 16/280, 355, 382
See application file for complete search history.

(56) References Cited

U.S. PATENT DOCUMENTS

| 7,412,271 | B2 * | 8/2008 | Cheng .......................... 455/575.3 |
| 2004/0266502 | A1 | 12/2004 | Holtorf et al. |
| 2006/0089181 | A1 | 4/2006 | Gartrell |
| 2006/0089182 | A1 | 4/2006 | Gartrell |
| 2007/0097014 | A1 * | 5/2007 | Solomon et al. ............... 345/1.1 |
| 2008/0011746 | A1 | 1/2008 | Rissmann |
| 2011/0128682 | A1 * | 6/2011 | Yamagishi ............... 361/679.01 |

FOREIGN PATENT DOCUMENTS

| CN | 1347233 A | 5/2002 |
| CN | 2807717 Y | 8/2006 |
| DE | 202006018553 U1 | 2/2007 |
| EP | 1740470 A2 | 1/2007 |

* cited by examiner

*Primary Examiner* — Hung Duong
(74) *Attorney, Agent, or Firm* — Morris Manning & Martin LLP; Tim Tingkang Xia, Esq.

(57) ABSTRACT

The invention discloses a foldable electronic device having a folding module pivotally connected to a first body and a second body. The folding module has at least one folding member with a first connecting portion and a second connecting portion defined thereon, wherein the first connecting portion and the second connecting portion are foldable along a first folding line defined there between, and the first connecting portion and the second connecting portion are connected to the first body and the second body respectively. With such, the structure of the folding module is simplified, the cost is reduced and the folding module is also easy to be assembled and repaired.

10 Claims, 9 Drawing Sheets

FOLDABLE ELECTRONIC DEVICE

BACKGROUND OF THE INVENTION

1. Field of the Invention

The invention relates to an electronic equipment, and more particularly to a foldable electronic device.

2. Description of the Related Art

FIG. 1 is an exploded diagram showing a conventional notebook computer hinge. The notebook computer hinge mainly includes a fixing base 1 with a combining hole, a sleeve 2 in the combining hole, a bent tubular spring sheet 3 and a pintle 4. Generally, the above said elements are embedded in the notebook computer and fixed by a plurality of screws.

In an assembling process, the pintle 4 passes through the tubular spring sheet 3, and then is disposed in the sleeve 2 with the tubular spring sheet 3. The hinge may provide a positioning effect via the torsion of the tubular spring sheet 3. In addition, the conventional fixing base 1 and the sleeve 2 are made individually, and the sleeve 2 is tightly mounted in the combining hole of the fixing base 1. The tight fit manner requires high dimensional precision of the parts. Furthermore, when the two parts are fitted, accumulated tolerances also should be considered, which increases the difficulty in manufacturing as well as the manufacturing cost.

To sum up, in the conventional notebook computer hinge, elements or parts are complex, highly cost, and difficult to be assembled. The above problem is the choke point in reducing the manufacturing cost of the notebook computer. Moreover, in the current low cost trend of the notebook computer, the deficiency of the conventional hinge gradually affects the market competition.

BRIEF SUMMARY OF THE INVENTION

The invention discloses a foldable electronic device including a folding module which is simplified in structure and easy to be assembled and repaired.

The invention discloses a foldable electronic device including a folding module for pivotally connecting a first body and a second body. The folding module includes at least one folding member. The folding member has multiple connecting portions defined thereon. The connecting portions are foldable along folding lines defined there between, and are connected to the first body and the second body respectively.

When operating, the connecting portions of the folding member are pivoting to each other along the folding line, and the folding line moves inward to allow the first body and the second body stack upon each other.

In an embodiment of the invention, a portion of the folding member where the folding line defined is thinner than other portion of the folding member, thus flexibility in the folding line is provided. In another embodiment, the folding line may be formed by folding the folding member in advance.

In another preferred embodiment, to improve the supporting strength of the folding module, the connecting portions of the folding member further connect to a first frame to support the first body, and to a second frame to support the second body.

These and other features, aspects and advantages of the present invention will become better understood with regard to the following description, appended claims, and accompanying drawings.

DETAILED DESCRIPTION OF THE EMBODIMENTS

The invention discloses a foldable electronic device with a folding module connecting a first body and the second body of the electronic equipment. Thus, the first body and the second body may be stacked upon each other or unstacked from each other.

Figure 1:
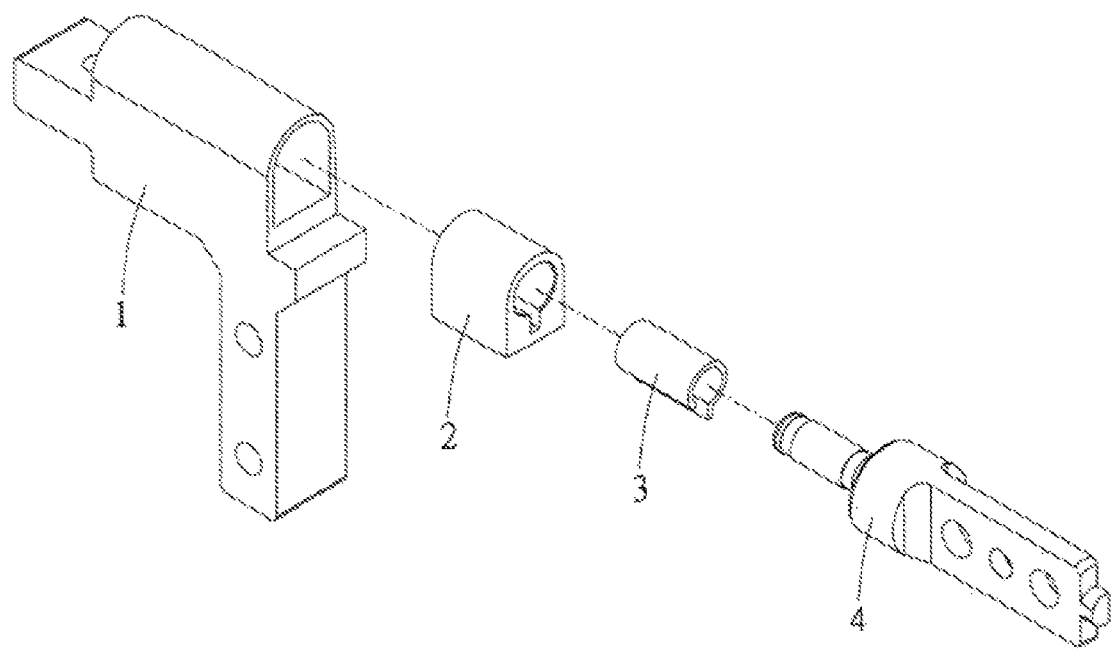
FIG. 1 is an exploded diagram showing a conventional notebook computer hinge.
Figure 2A:
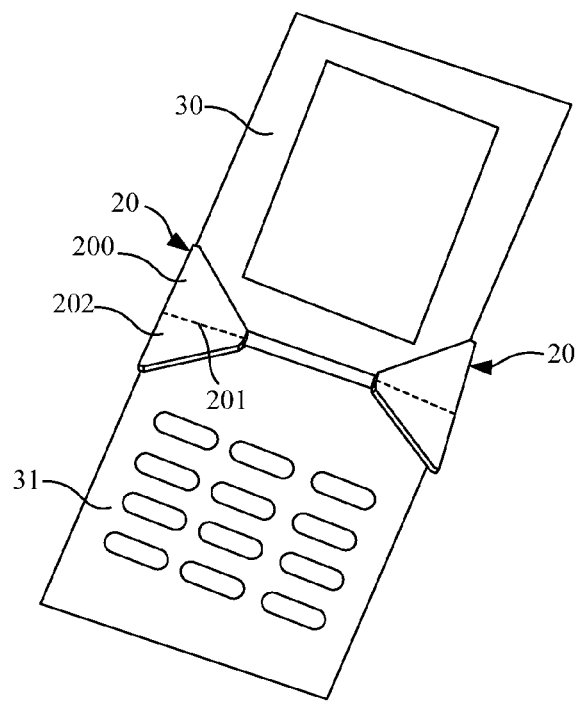
FIG. 2A and FIG. 2B are schematic diagrams showing the application of the folding module in a first embodiment of the invention.
Figure 2B:
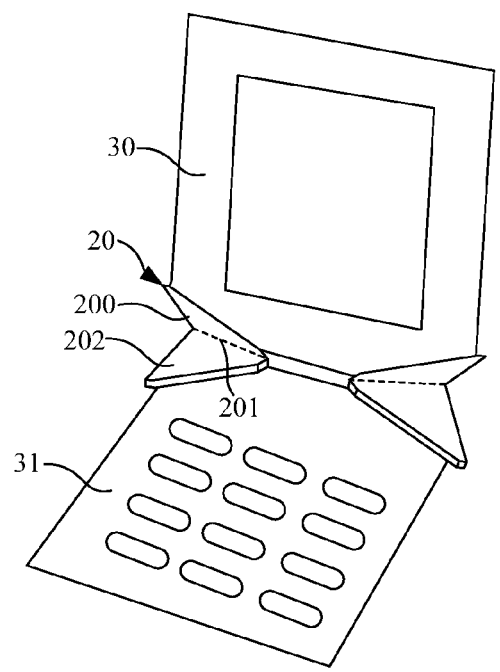

FIG. 2A and FIG. 2B are schematic diagrams showing the application of the folding module in a first embodiment of the invention. In FIG. 2A and FIG. 2B, the folding module is used in, for example, a foldable mobile phone. In practical application, the folding module in the invention also may be used in other foldable devices such as a foldable gaming machine, a foldable multi-media player or a notebook computer.

As shown in FIG. 2A and FIG. 2B, the folding module in the invention includes a pair of sheet folding members 20. In practical application, the folding members 20 may be made of flexible materials such as polypropylene (PP) and polyethylene (PE) or other plastic materials alike. In manufacturing, the folding module in the invention may be integrally formed in an injection molding process.

Each folding member 20 has a first folding line 201 dividing the folding member 20 into a first connecting portion 200 and a second connecting portion 202. The first connecting portions 200 of the folding members 20 may be connected to a first body 30 (such as a panel cover) of the foldable mobile phone, and the second connecting portions 202 of the folding members 20 maybe connected to the second body 31 (such as a keyboard base) of the mobile phone. In other word, the folding module is used for pivotally connecting the first body 30 and the second body 31.

In an embodiment, after being manufactured via the injection molding process, the folding members 20 may be folded in advance to define a first folding line 201 shown in FIG. 2A. In another embodiment, a portion of the folding member 20 where the first folding line 201 defined is thinner than other portion of the folding member 20, thus the first folding line 201 is easy to be formed after the folding member 20 is folded.

In the embodiment, each folding member 20 is folded in half and divided into a first connecting portion 200 and second connecting portion 202 having the same size. The first folding line 201 in the embodiment is located at a middle of the folding member 20 to make the edge of the first body 30 coincide with the edge of the second body 31 after the mobile phone is folded. Basically, the folding manner of the first body 30 and the second body 31 may be adjusted according to the position of the first folding line 201, and the position of the first folding line 201 is not limited to be at a middle of the folding member 20.

FIG. 2A is a schematic diagram showing that the foldable mobile phone is completely opened. FIG. 2B is a schematic diagram showing the foldable mobile phone is folding. As shown in FIG. 2B, when folding, the first connecting portion 200 and the second connecting portion 202 of the folding member 20 are pivoting to each other along the first folding line 201, and the first folding line 201 moves towards the inside of the mobile phone.

After the mobile phone is completely folded, the first connecting portion 200 and the second connecting portion 202 of the folding member 20 are stacked upon each other along the first folding line 201. Furthermore, since the first folding line 201 moves towards the inside of the mobile phone when folding, after the mobile phone is completely folded, the first connecting portion 200 and the second connecting portion 202 of the folding member 20 may be between the first body 30 and the second body 31. Thus, the folding member 20 may be hidden between the first body 30 and the second body 31 to keep a neat appearance.

Figure 3A:
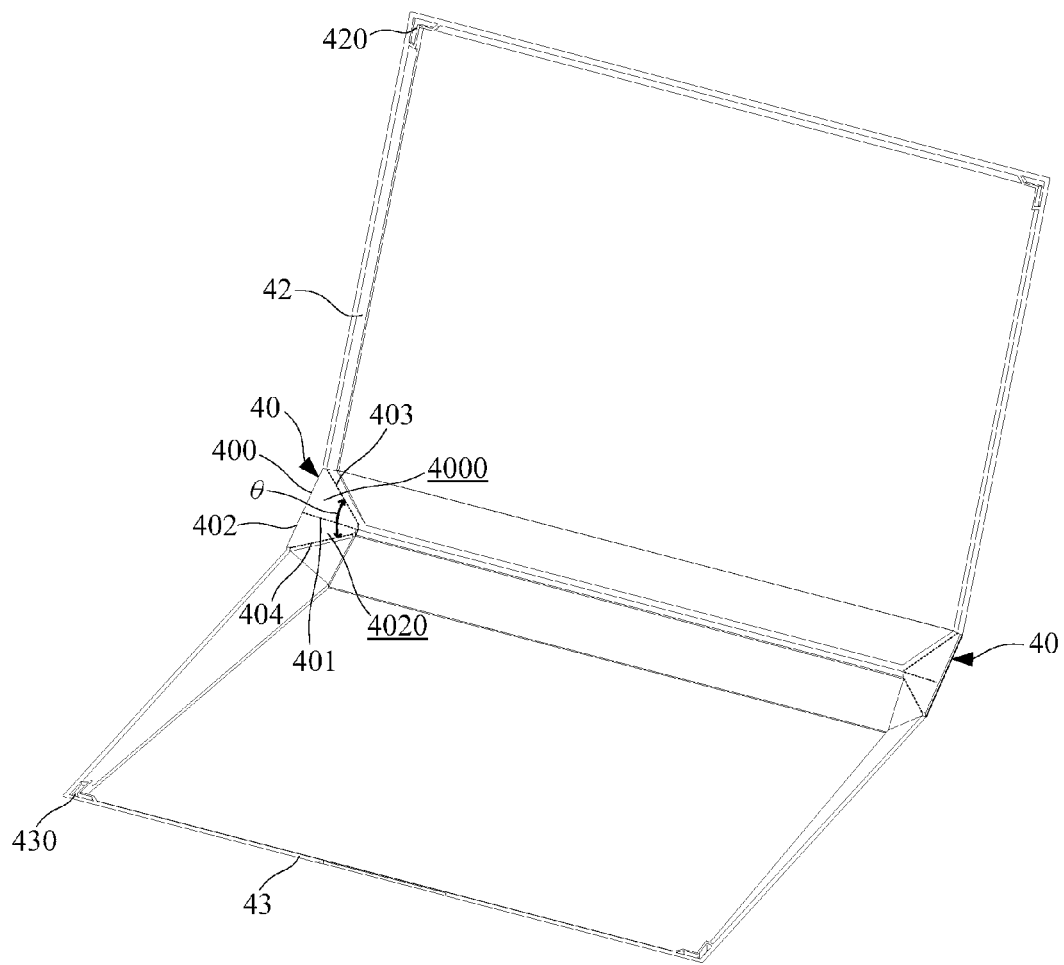
FIG. 3A is a schematic diagram showing that the folding module in the second embodiment of the invention is completely opened.
Figure 3B:
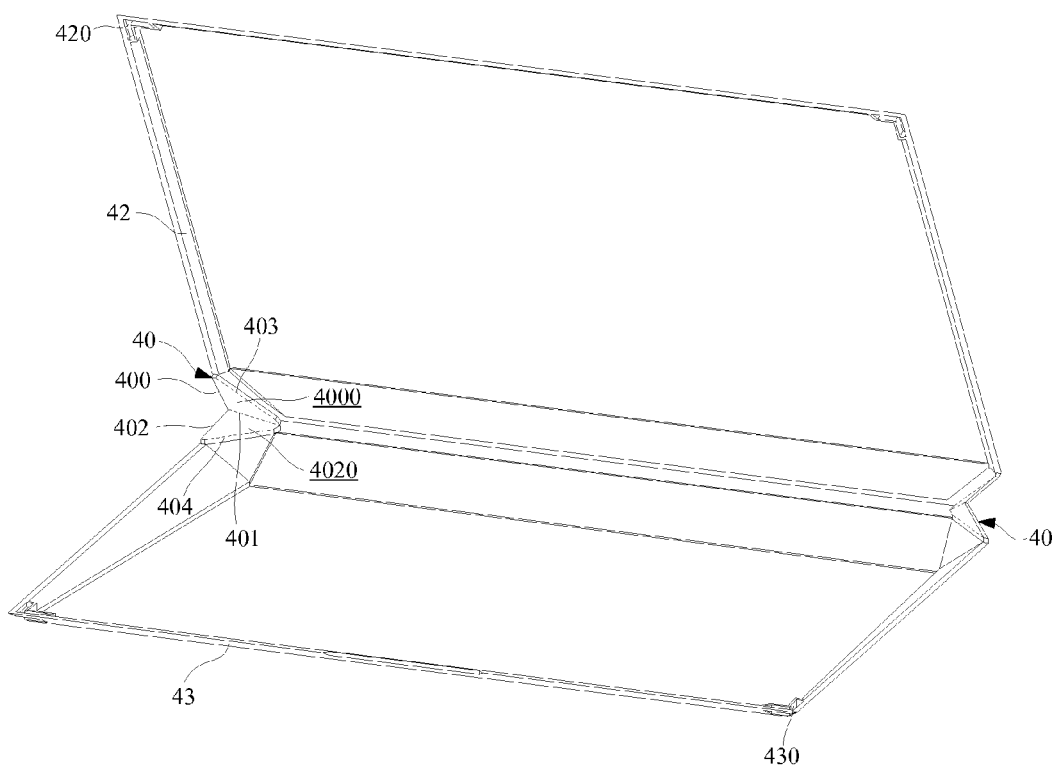
FIG. 3B is a schematic diagram showing that the folding module in FIG. 3A is incompletely opened.
Figure 3C:
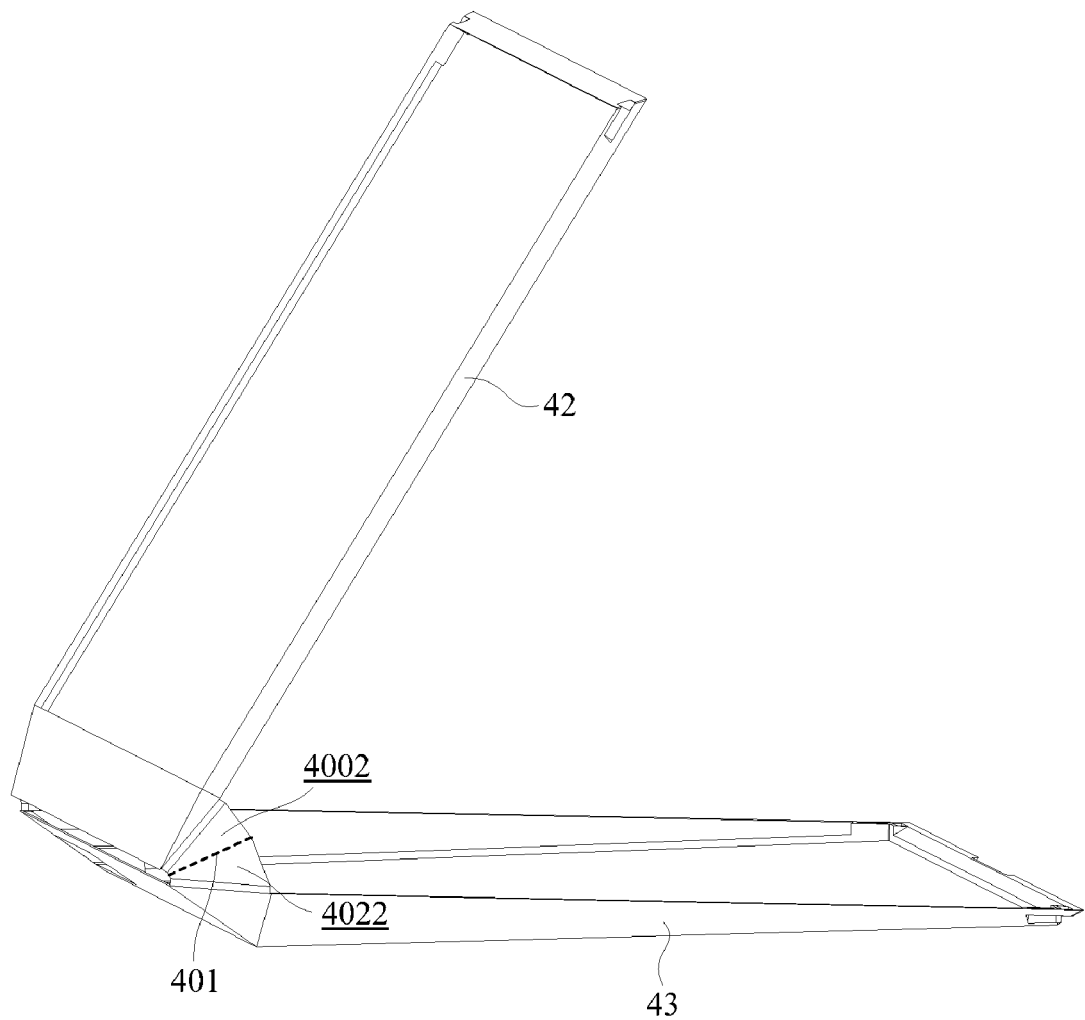
FIG. 3C is a side view showing the folding module in FIG. 3B.

FIG. 3A to FIG. 3D are schematic diagrams showing the folding module in a second embodiment of the invention. FIG. 3A is a schematic diagram showing that the folding module is complete opened, FIG. 3B is a schematic diagram showing that the folding module is incompletely opened, and FIG. 3C is a side view diagram showing the folding module in FIG. 3B. In addition, FIG. 4A to FIG. 4C are schematic diagrams showing folding module in the second embodiment used in the foldable electronic device. In FIG. 4A to FIG. 4C, the folding module is used in a notebook computer, which is taken as an example.

As shown in FIG. 3A, the folding module includes a pair of sheet foldable folding members 40. In addition, each folding member 40 has a first folding line 401 dividing the folding member 40 into a first connecting portion 400 and a second connecting portion 402. In the embodiment, the folding member 40 is folded in half and divided into a first connecting portion 400 and a second connecting portion 402 having the same size. The first connecting portion 400 has an inner surface 4000 and an outer surface 4002, and the second connecting portion 402 has an inner surface 4020 and an outer surface 4022.

Compared with the first embodiment, in this embodiment, the first connecting portions 400 of the folding members 40 further integrally connect to a first frame 42, and the second connecting portions 402 of the folding members 40 further integrally connect to a second frame 43.

Thus, the first connecting portions 400 of the folding members 40 are connected to a first body 50 (such as a panel cover) of the notebook computer, and the first frame 42 formed by the extension portion of the first connecting portions 400 may support the first body 50. Similarly, the second connecting portions 402 of the folding members 40 are connected to a second body 52 (such as a keyboard base) of the notebook computer, and the second frame 43 formed by the extension portion of the second connecting portions may support the second body 52. Using the first frame 42 and the second frame 43, the supporting strength of the folding module in the embodiment is increased.

In addition, as shown in FIG. 3A, the first frame 42 has at least one fixing hole 420, and the second frame 43 also has at least one fixing hole 430. In an embodiment, the first body 50 may have a hook to be fixed to the first frame 42 via the fixing hole 430. The second body 52 also may have a hook to be fixed to the second frame 43 via the fixing hole 430.

In practical application, the folding members 40, the first frame 42 and the second frame 43 may be made of flexible and plastic materials such as PP or PE. The folding module in the embodiment may be manufactured via the injection molding process, and the folding members 40, the first frame 42 and the second frame 43 are integrally formed in structure.

In an embodiment, after the folding module is manufactured via the injection molding process, the folding member 40 may be folded in advance to form the first folding line 401. In another embodiment, a portion of the folding member 40 where the first folding line 401 defined is thinner than other portion of the folding member 40, thus the first folding line 401 is easy to be formed at the thinner portion of the flat folding member 40 after the folding member 40 is folded.

In a preferred embodiment, a second folding line 403 is defined between the first connecting portion 400 of each of the folding members 40 and the first frame 42. The first connecting portion 400 and the first frame 42 are foldable along a second folding line 403 defined there between. Similarly, the junction between the second connecting portion 402 of each folding member 40 and the second frame 43 may have a third folding line 404. The second connecting portion 402 and the second frame 43 are foldable along the third folding line 404 defined there between.

FIG. 3B and FIG. 4B with the illustration herein below show the movement change of the folding module in the embodiment. FIG. 3B is a schematic diagram showing the folding module is folding. FIG. 4B is a schematic diagram showing the notebook computer is incompletely folded. As shown in FIG. 3B, when folding the folding module, the first connecting portion 400 and the second connecting portion 402 of the folding member 40 may be pivoting to each other along the first folding line 401, and the first folding line 401 moves inward.

As shown in FIG. 3C, since the first connecting portion 400 and the second connecting portion 402 of the folding member 40 are pivoting to each other, the outer surface 4002 of the first connecting portion 400 and the outer surface 4022 of the second connecting portion 402 gradually get close to each other when folding the folding member 40.

Figure 3D:
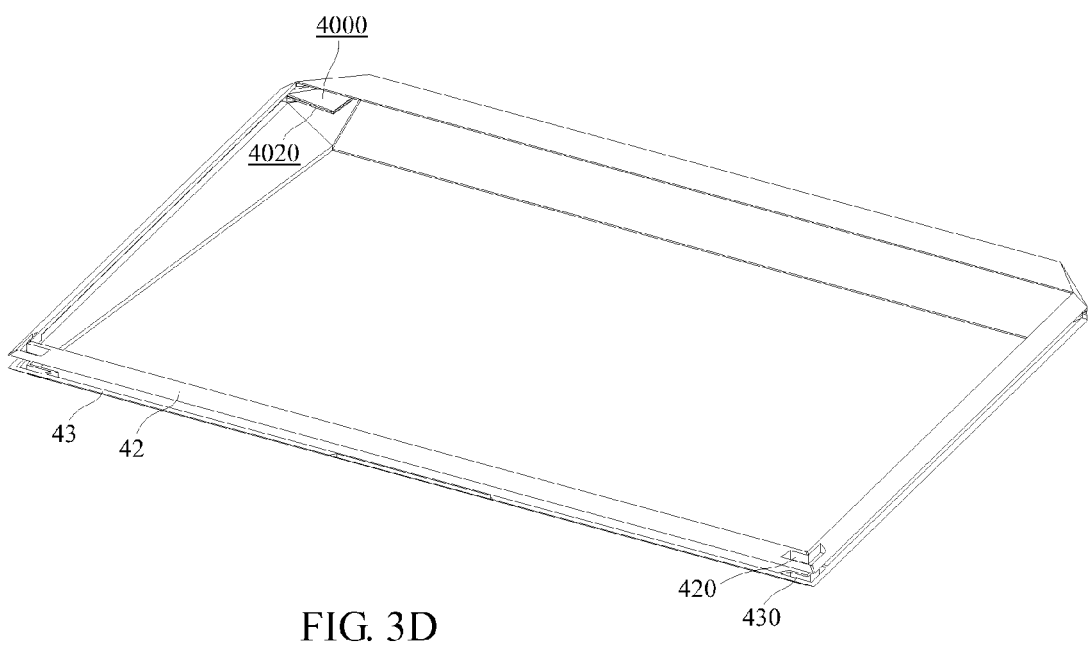
FIG. 3D is a schematic diagram showing that the folding module in FIG. 3A is folded.
Figure 4A:
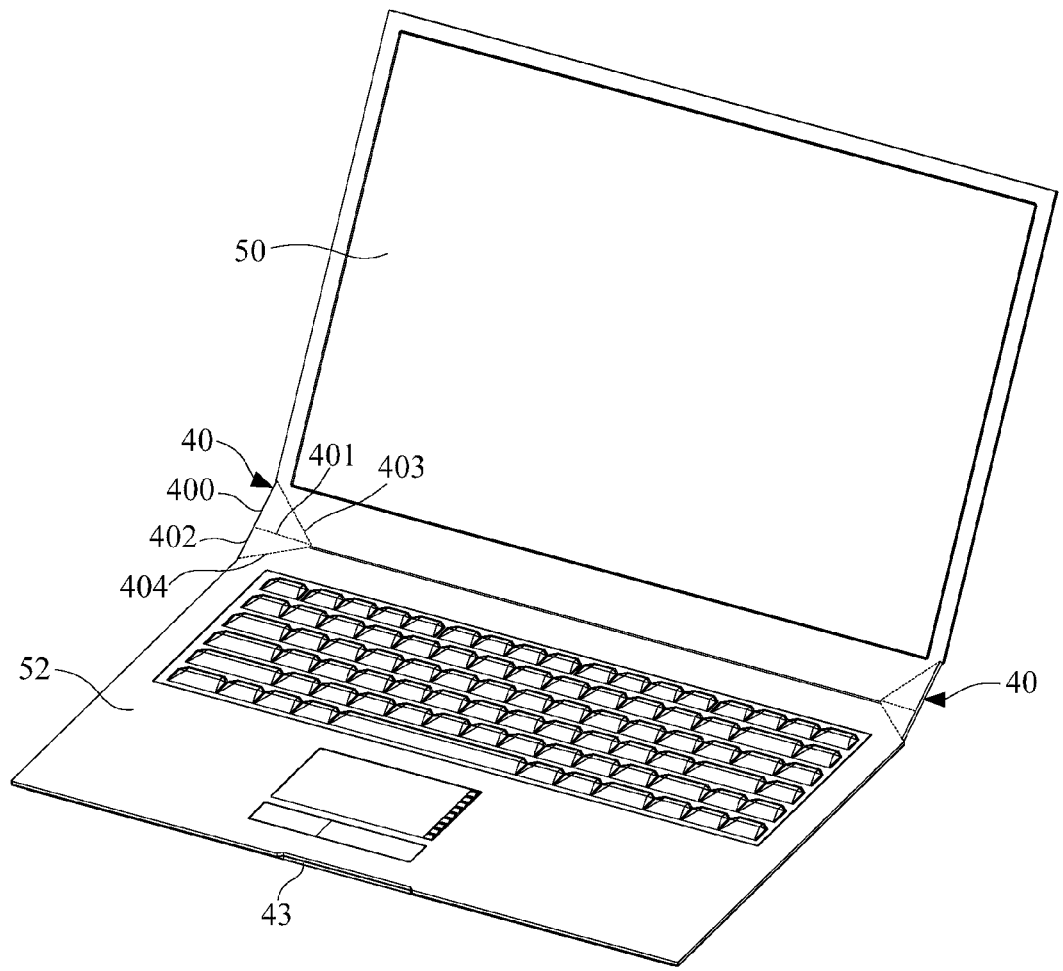
FIG. 4A is a schematic diagram showing that the folding module in a second embodiment of the invention is used in foldable electronic device.
Figure 4B:
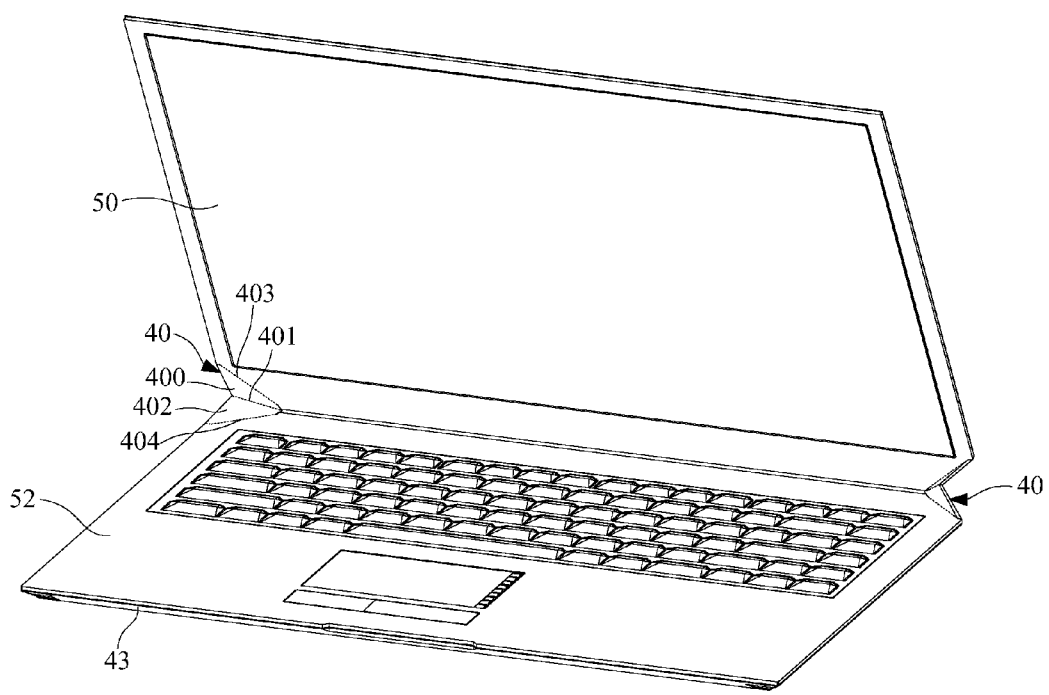
FIG. 4B is a schematic diagram showing that the foldable electronic device is incompletely opened.
Figure 4C:
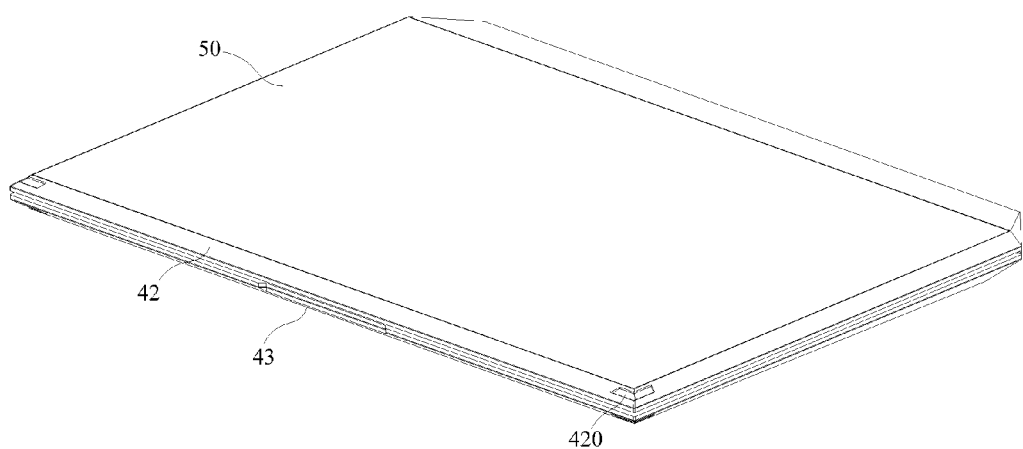
FIG. 4C is a schematic diagram showing that the foldable electronic device is folded.

As shown in FIG. 3D and FIG. 4C, FIG. 3D is a schematic diagram showing that the folding module in the embodiment of the invention is folded. FIG. 4C is a schematic diagram showing that the notebook computer is folded. After the folding member 40 is folded, the first connecting portion 400 and the second connecting portion 402 of the folding member 40 may be stacked upon each other via the first folding line 401. In addition, the first frame 42 also may be coincided with the second frame 43 after it is turned via the second folding line 403.

As shown in FIG. 3D, since the first connecting portion 400 and the second connecting portion 402 of the folding member 40 are pivoting to each other, after the first connecting portion 400 and the second connecting portion 402 are stacked upon each other, the outer surface 4002 of the first connecting portion 400 and the outer surface 4022 of the second connecting portion 402 contact each other closely, and the inner surface 4000 of the first connecting portion 400 and the inner surface 4020 of the second connecting portion 402 face outward.

Furthermore, as shown in FIG. 4C, since the first folding line 401 moves inward when folding the folding module, after the folding module is completely folded, the first connecting portion 400 and the second connecting portion 402 of the folding member 40 may be stacked upon each other between the first body 50 and the second body 52. Thus, the folding member 40 is hidden between the first body 50 and the second body 52 to keep a neat appearance of the notebook computer.

As shown in FIG. 3A, an angle θ defined after the first connecting portion 400 and the second connecting portion 402 of the folding member 40 are completely unfolded determines an opening angle between the first body 50 and the second body 52. In the structure, if the angle θ between the first connecting portion 400 and the second connecting portion 402 is large, the opening angle between the first body and the second body is large. In such design, the opening angle between the first body 50 and the second body 52 may be pre-designed to any special angle, such as 90 degrees, 120 degrees, or 150 degrees.

Compared with the conventional technology, the folding module of the foldable electronic device in the invention has simplified structure, low cost, and is easy to be assembled, repaired and replaced. In addition, with folding lines of the folding module in the invention, it is easy to fold and unfold the folding module. Furthermore, since the folding module is integrally formed, it also guaranteed that the folding module has good structure strength.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A foldable electronic device comprising:
   a first body;
   a second body; and
   a folding module having at least one folding member with a first connecting portion and a second connecting portion defined thereon;
   wherein the first connecting portion and the second connecting portion are foldable along a first folding line defined there between, and the first connecting portion and the second connecting portion are connected to the first body and the second body respectively.

2. The foldable electronic device according to claim 1, wherein the first connecting portion and the second connecting portion fold to each other along the first folding line.

3. The foldable electronic device according to claim 2, wherein the folding member is folded in advance to define the first folding line.

4. The foldable electronic device according to claim 1, wherein a portion of the folding member where the first folding line defined is thinner than other portion of the folding member.

5. The foldable electronic device according to claim 1, wherein the first connecting portion further connects to a first frame.

6. The foldable electronic device according to claim 5, wherein the first connecting portion and the first frame are foldable along a second folding line defined there between.

7. The foldable electronic device according to claim 5, wherein the first frame has at least one fixing hole.

8. The foldable electronic device according to claim 1, wherein the second connecting portion further connect to a second frame.

9. The foldable electronic device according to claim 8, wherein the second connecting portion and the second frame are foldable along a third folding line defined there between.

10. The foldable electronic device according to claim 8, wherein the second frame has at least one fixing hole.

* * * * *